(12) United States Patent
Yamamoto (10) Patent No.: US 7,446,751 B2
(45) Date of Patent: Nov. 4, 2008

(54) DATA INPUT DEVICE, DATA INPUT METHOD, AND DATA INPUT PROGRAM

(75) Inventor: Atsushi Yamamoto, Tokyo (JP)

(73) Assignee: Fujitsu Limited, Kawasaki (JP)

( * ) Notice: Subject to any disclaimer, the term of this patent is extended or adjusted under 35 U.S.C. 154(b) by 62 days.

(21) Appl. No.: 10/285,521

(22) Filed: Nov. 1, 2002

(65) Prior Publication Data

US 2003/0193474 A1 Oct. 16, 2003

(30) Foreign Application Priority Data

Apr. 15, 2002 (JP) ............................. 2002-111766

(51) Int. Cl.
*G09G 5/00* (2006.01)

(52) U.S. Cl. ..................... 345/156; 345/157; 345/184

(58) Field of Classification Search ......... 345/156–184, 345/700, 810, 83.3, 800; 715/764, 833, 856, 715/974
See application file for complete search history.

(56) References Cited

U.S. PATENT DOCUMENTS

| | | | | |
|---|---|---|---|---|
| 5,499,325 A | * | 3/1996 | Dugan, Jr. ................... | 345/594 |
| 5,682,488 A | * | 10/1997 | Gleason et al. .............. | 345/833 |
| 5,736,974 A | * | 4/1998 | Selker ......................... | 715/862 |
| 5,872,555 A | * | 2/1999 | Kolar et al. .................. | 345/594 |
| 5,903,255 A | * | 5/1999 | Busch et al. ................. | 345/594 |
| 6,226,010 B1 | * | 5/2001 | Long ........................... | 345/594 |
| 6,243,096 B1 | | 6/2001 | Takanashi | |
| 6,348,936 B1 | * | 2/2002 | Berteig ....................... | 345/856 |
| 6,670,972 B2 | * | 12/2003 | Grieve et al. ................ | 715/833 |
| 6,697,079 B2 | * | 2/2004 | Rose ........................... | 345/593 |
| 6,750,889 B1 | * | 6/2004 | Livingston .................. | 715/833 |

FOREIGN PATENT DOCUMENTS

| | | | | |
|---|---|---|---|---|
| GB | 2 307 383 | * | 5/1997 | ................. 715/833 |
| JP | 63-191277 | | 8/1988 | |
| JP | 07-281831 | | 10/1995 | |
| JP | 11-120384 | | 4/1999 | |
| JP | 2001-202197 A | | 7/2001 | |

* cited by examiner

*Primary Examiner*—Regina Liang
(74) *Attorney, Agent, or Firm*—Staas & Halsey LLP (57) ABSTRACT

Parameters are input by operating a slider with a mouse. A position over the slider is pointed with the mouse. This position over the slider is converted into two parameters based on the coordinates of the position over the mouse. The third parameter is input by sliding the slider with a drag operation of the mouse. Parameters can be input with lesser number of operations and lesser display area is required.

9 Claims, 11 Drawing Sheets

DATA INPUT DEVICE, DATA INPUT METHOD, AND DATA INPUT PROGRAM

BACKGROUND OF THE INVENTION

1) Field of the Invention

The present invention relates to a data input device, a data input method, and a data input program in which it is possible to input parameters by operating an object that is displayed on a display.

2) Description of the Related Art

Recently, along the development of work stations, it has become a main stream to input data by utilizing an operating system (OS) or a graphical user interface (GUI) function as an application program that is operated on the OS. When such a GUI function is provided, a user can select an object that has been displayed on a screen ("display object") with a pointing device such as a mouse, or input numerical parameter values (data) relating to the display object. The display object is allocated with a predetermined function.

Figure 12A:
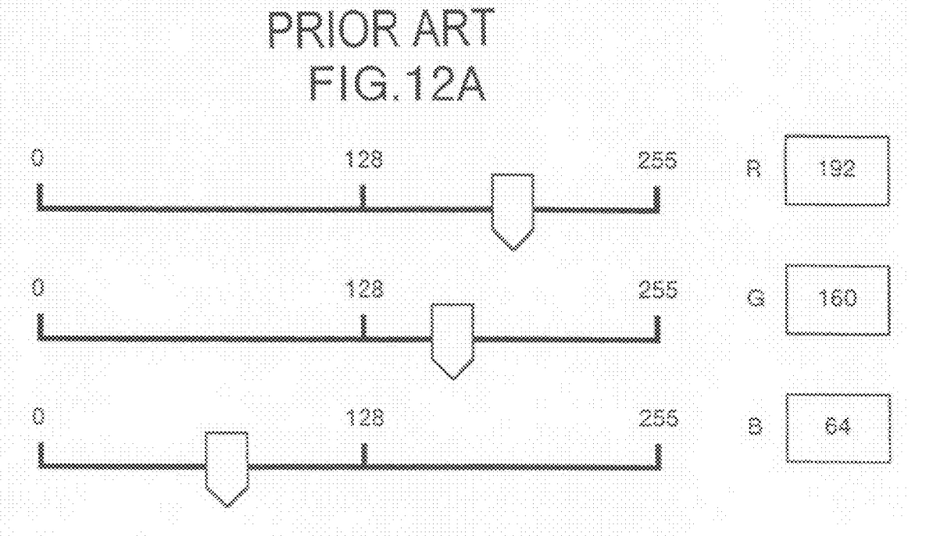
FIG. 12A is a view that shows a conventional example of a display object (a screen example) when a slider control is used to input data.
Figure 12B:
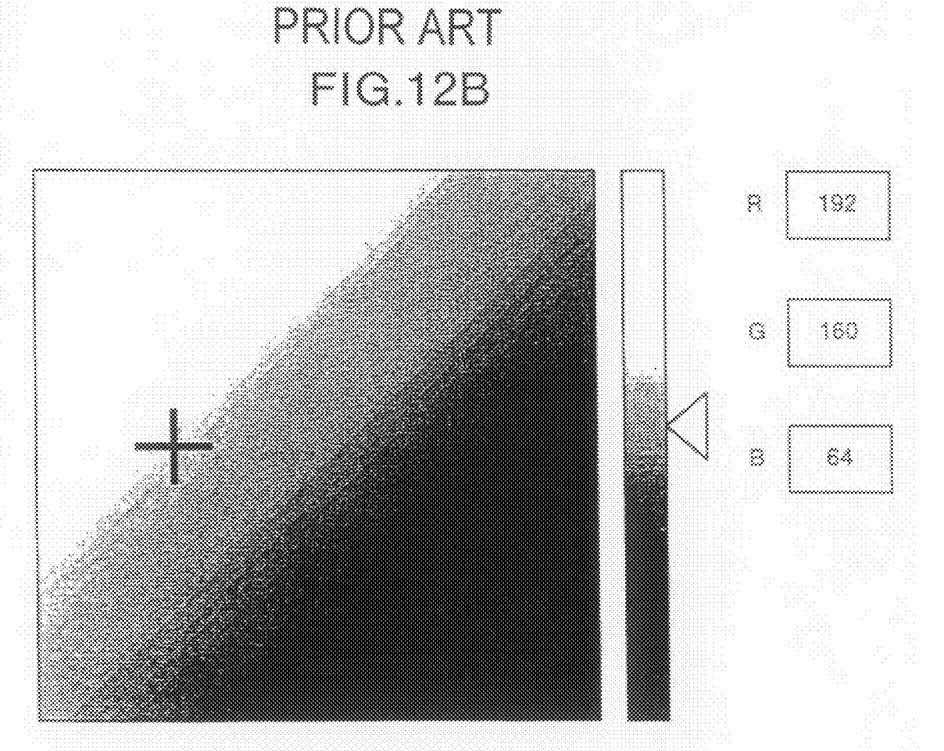
FIG. 12B is a view that shows a conventional example of a display object (a screen example) when a color chart is used to input data.

A conventional data input method of a display object that utilizes a GUI function will be explained below with reference to FIG. 12A and FIG. 12B. FIG. 12A and FIG. 12B show examples of optionally setting a plurality of color data (R, G, and B as the three primary colors in these examples) in the setting of a desktop environment and an image editing software. A mouse is used as a pointing device.

FIG. 12A shows an example of a data input method that uses a slider control as a display object. This slider control has a knob and a line along which this knob can move. A plurality of (three, in this example) slider controls are prepared corresponding to the setting of parameters (data input) of the color data (R, G, and B).

In the example shown in FIG. 12A, each slider control has a minimum value of zero and a maximum value of 255. Therefore, it is possible to input data values within the range of 0 to 255 corresponding to a position of the knob. The knob can be moved using a mouse device ("mouse").

It is possible to input a desired value as data by moving the knob along the line with the mouse. In the example shown in FIG. 12A, values of R, G, and B have been set to 192, 160, and 64 respectively.

FIG. 12B shows an example of a data input method that uses a color chart. A display object is structured with a square grid of a large display size, and a vertical scale that is adjacent to this grid.

The grid is used to adjust hue and vividness. Hue is set to a horizontal axis, and vividness is set to a vertical axis. In this grid, a minimum value of hue is set to the left end of the horizontal axis, and a maximum value of hue is set to the right end of the horizontal axis. A minimum value of vividness is set to the bottom end of the vertical axis, and a maximum value of vividness is set to the top end of the vertical axis. Based on this arrangement, it is possible to set continuously changing colors between both ends.

A cross pointer is provided within the grid. It is possible to set values of hue and vividness corresponding to a display position of this cross pointer. On the other hand, the vertical scale is used to adjust brightness. A minimum value of brightness is set to the bottom end of the vertical axis, and a maximum value of brightness is set to the top end of the vertical axis. It is possible to set continuously changing values between both ends. Specifically, it is possible to set a value of brightness corresponding to a display position of an arrow-mark pointer that is provided at the right side of the vertical scale.

In other words, it is possible to set a display position by dragging the cross pointer with the mouse, and it is possible to input a desired value relating to hue, vividness, and brightness by setting (moving) the arrow-mark pointer of the vertical scale to an optional position. The hue, vividness, and brightness that are set with the cross pointer and the arrow-mark pointer are converted into each value of R, G, and B according to a predetermined table. The converted value is displayed as a sample color in a display area, not shown, that is provided on the same screen as the color chart.

However, the conventional data input method has the following problems. According to, the display object that utilizes the slider controls, one slider control can input (set) only one parameter value. Therefore, when there are a plurality of parameters that require the data setting, it is necessary to move knobs of the corresponding slider controls to predetermined positions with the mouse. This has had a problem of complicating the operation.

According to the display object that utilizes the color chart, when there are a plurality of parameters that require the setting, it is necessary to operate the cross pointer and the arrow-mark pointer separately. Therefore, the user is forced to move the pointers as well as the slider controls with the mouse. This has had also a problem of complicating the operation. Particularly, when it is the color chart, it is necessary to repetitively adjust each pointer position based on a display sample that is displayed in the display area, in order to obtain a desired result. This has had, a possibility of complicating the operation.

In the color chart, it is possible to input two parameters of hue and vividness by operating the cross pointer in two dimensions on the grid. However, there, is only one value that can be input per dimension. In order to input many parameter values, it has been necessary to display the vertical scale and other grid as shown in FIG. 12B.

As explained above, conventionally, a large portion of the screen display area is occupied by controllers for the user to operate these controllers in order to input a plurality of parameter values. Therefore, information that is displayed on the screen is hidden by the other work, and it becomes difficult to know the contents of the information.

Further, only one parameter can be input with the slider control and the color chart. Although the user control area (the display object) occupies a large proportion of the display area on the screen, that number of values that can be input is small. Therefore, there has been a problem that the work efficiency is lowered, as the control display hides the information.

SUMMARY OF THE INVENTION

It is an object of this invention to provide a data input device, a data input method, and a data input program that can input a plurality of parameter values (data) in a small display area, and improve convenience and operability for a user by preventing the hiding of other display information.

The data input device according to one aspect of the present invention carries out a data input by operating a displayed object that has a graphic display and user interface function. This data input device comprises an indication position detecting unit that detects an indication position, the indication position being a position of a pointer that is operated by a user on the object; a display position detecting unit that detects a display position of the object; and an input value setting unit that sets a plurality of parameter data input values based on the indication position obtained by the indication position detecting unit and the display position obtained by the display position detecting unit.

The data input method according to another aspect of the present invention is a method of inputting data by operating an object that has a graphic display and user interface function. This data input method comprises detecting an indication position, the indication position being a position of a pointer that is operated by a user on the object; detecting a display position of the object; and setting a plurality of parameter data input values based on the detected indication position and the display position.

The data input program according to still another aspect of the present invention realizes the data input method according to the present invention on a computer.

These and other objects, features and advantages of the present invention are specifically set forth in or will become apparent from the following detailed descriptions of the invention when read in conjunction with the accompanying drawings.

DETAILED DESCRIPTIONS

A data input device, a data input method, and a data input program according to the first embodiment of the present invention will be explained in detail below with reference to the accompanying drawings.

Figure 1:
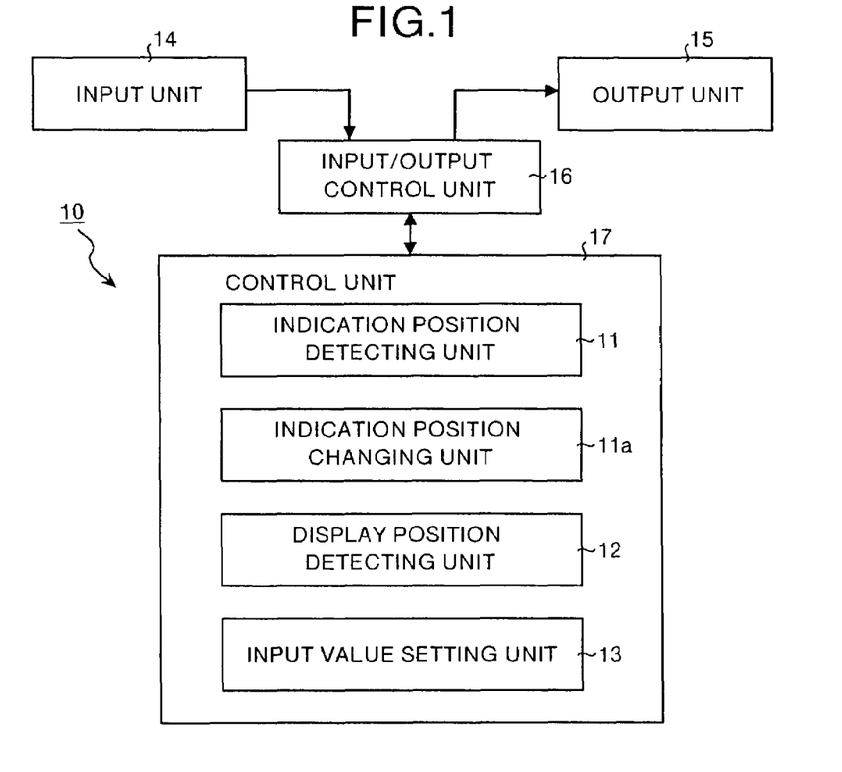
FIG. 1 is a functional block diagram of a data input device according to a first embodiment of the present invention.
Figure 2:
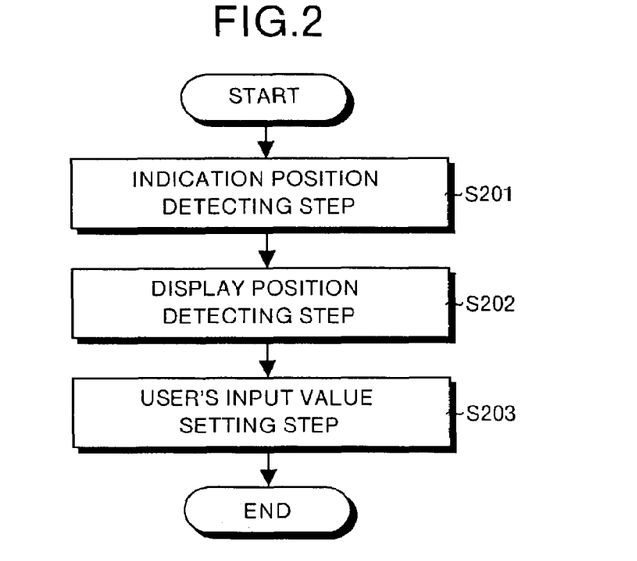
FIG. 2 is a flowchart that shows a processing procedure of a data input method that is applied to the data input device shown in FIG. 1.

FIG. 1 is a functional block diagram of a data input device 10 relating to the first embodiment. FIG. 2 is a flowchart of a data input method relating to the first embodiment.

As shown in FIG. 1, the data input device 10 is constructed of an input unit 14, an output unit 15, an input-output control unit 16, and a control unit 17. The control unit 17 is constructed of an indication position detecting unit 11, an indication position changing unit 11a, a display position detecting unit 12, and an input value setting unit 13. The indication position detecting unit 11 has a function of detecting an indication position on a display object that is indicated with a mouse pointer that a user operates. The indication position changing unit 11a has a function of optionally changing an indication position that has been once set.

The display position detecting unit 12 has a function of detecting a display position of a display object with the mouse pointer that the user operates. The input value setting unit 13 has a function of setting a plurality of parameter data input values based on an indication position on a display object and a display position of the display object that have been obtained by the indication position detecting unit 11 and the display position detecting unit 12 respectively.

The control section 17 has a controller function of controlling the whole data input device 10. The input unit 14 has an operating function of setting data by operating the display object via the input-output control unit 16. A mouse is used as a pointing device of this input unit 14.

The output unit 15 has a display function of displaying processing results of the indication position detecting unit 11, the indication position changing unit 11a, the display position detecting unit 12, and the input value setting unit 13 within the control section 17 via the input-output control unit 16. A display screen (CRT) of a personal computer is used as the output unit 15.

As shown in FIG. 2, a data input method of the data input device relating to the present invention is broadly constructed of three steps of (1) an indication position detecting step, (2) a display position detecting step, and (3) an input value setting step (step S201 to step S203). The indication position detecting step is a step of detecting an indication position on a knob that has been indicated by a user. The display position detecting step is a step of detecting a display position on a line that has been moved by clicking the mouse by the user. The input value setting step is a step of setting a plurality of parameter input values (data) based on the indication position and the display position that have been obtained at the indication position detecting step and the display position detecting step respectively.

Figure 3A:
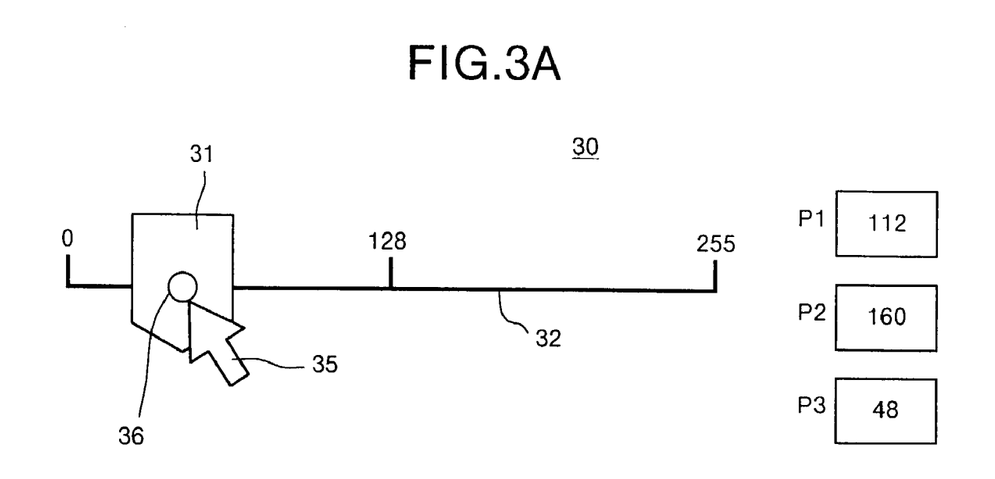
FIG. 3A is a view of a screen example when a display object has been caught by clicking a mouse.
Figure 3B:
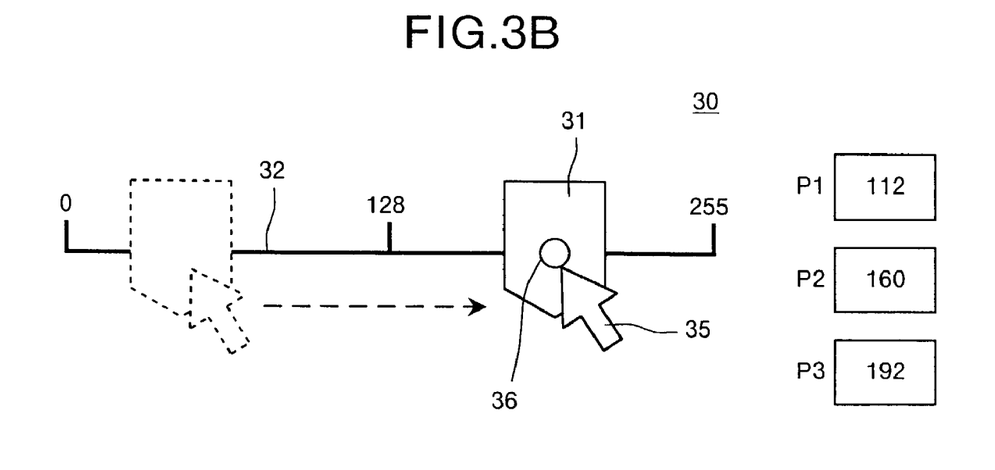
FIG. 3B is a view of a screen example when the display object has been dragged.

The first embodiment of the present invention will be explained in detail below with reference to FIG. 3A and FIG. 3B. FIG. 3A and FIG. 3B show screens of a display object that is displayed on a display. An example that optional color data (R, G, and B) are set in the setting of a desktop environment and an image editing software, like in the explanation shown in FIG. 12 will be described. A mouse will be used as a pointing device.

FIG. 3A shows a display screen when a user has moved a mouse pointer onto a knob, and clicked the mouse. FIG. 3B shows a display screen when the user has dragged the knob to move it along the line, in the state that the knob has been caught with the mouse pointer without releasing the depressed finger from the mouse. In other words, as shown in FIG. 3A, a display object 30 is constructed of a part that shows a knob 31, a part that shows a line 32 along which this knob 31 can move, and areas P1, P2, and P3 in which data is input.

Specifically, it is possible to input (set) data of desired values by clicking the mouse to catch the knob 31 and also by dragging the knob to move it along the line 32. The input data are stored in the area P1, the area P2, and the area P3 respectively, and are displayed as parameter values respectively. As explained above, according to the first embodiment, it is possible to input three parameters as data with one knob and one line.

In other words, in FIG. 3A, by moving the mouse pointer 35 to the knob 31 and clicking the mouse, it is possible to calculate input values as data based on an indication position of the mouse pointer 35 on the knob 31. The calculated values are displayed in the area P1 and the area P2 respectively. A calculation method will be explained later. A reference number 36 denotes a marker that shows a position indicated with the mouse pointer 35. In this example, based on a display of an indication position with the marker 36, it is possible to adjust parameter set values while estimating an indication position on the knob 31 at which desired values can be obtained.

Further, in FIG. 3A, it is possible to change values by dragging the knob 31 to move it with the mouse pointer 35 in a state that the mouse has been clicked and kept depressed with the finger. By dragging, a display screen as shown in FIG. 3B is obtained. On the display screen shown in FIG. 3B, as the display position of the knob 31 on the line has been moved, a value corresponding to this display position of the knob 31 is calculated, and this value is displayed in the area P3. A method of calculating this value corresponding to this display position of the knob 31 is similar to that of the slider control explained in the above conventional technique. Therefore, a detailed explanation of this calculation method will be omitted.

The processing based on an indication position when the mouse pointer has been moved and the mouse has been clicked, in FIG. 3A, will be explained in detail with reference to FIG. 4.

Figure 4:
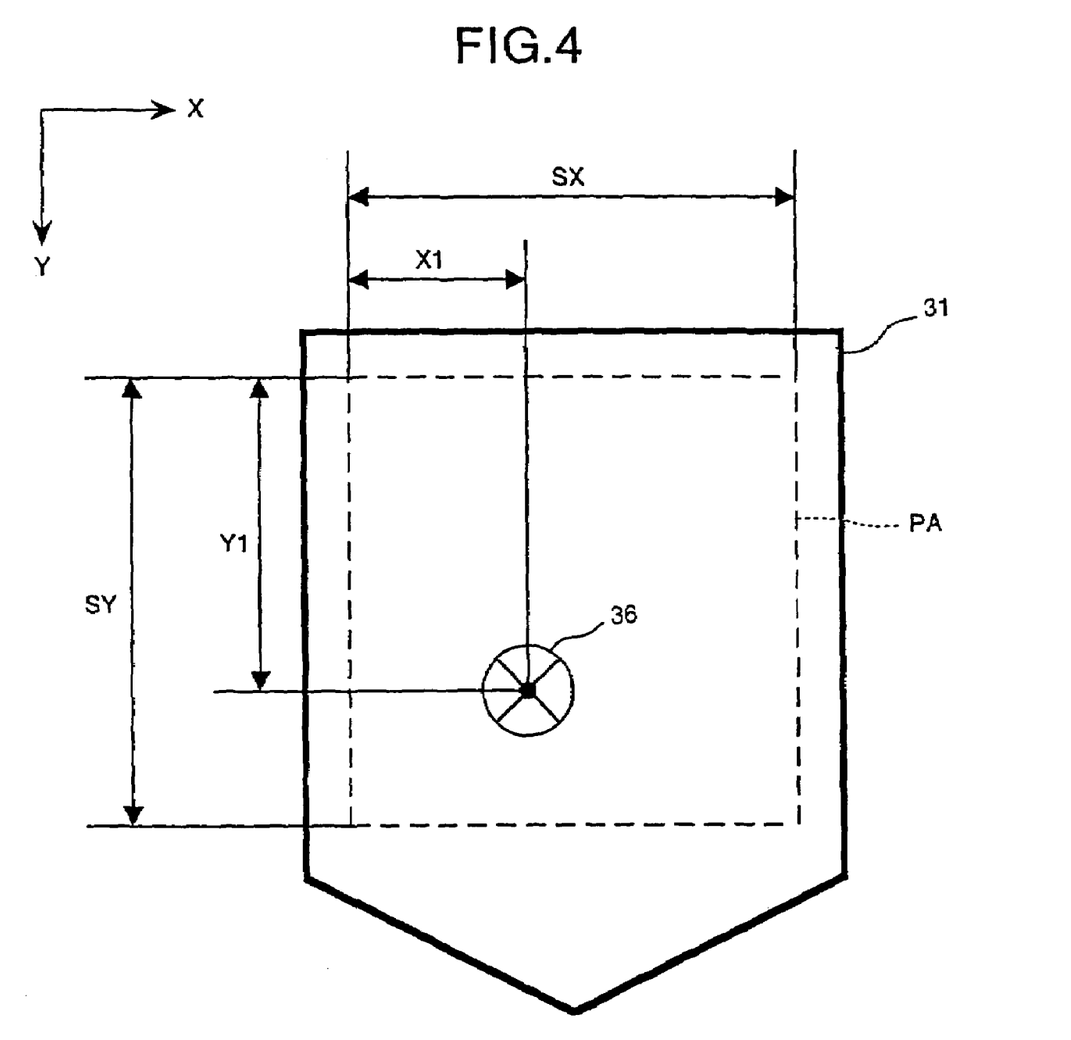
FIG. 4 is a view that explains a calculation example of an input value based on an indication position on a knob.

As shown in FIG. 4, the knob is set with an indication position detecting area PA for optionally specifying an indication position. This indication position detecting area PA is set with an X coordinate in the horizontal direction and a Y coordinate in the vertical direction. The indication position detecting area PA has been provided with a rectangular area that has prescribed sizes of an SX size in the X coordinate direction and an SY size in the Y coordinate direction, with the left top end as the origin in FIG. 4. An X coordinate direction minimum value and a Y coordinate direction minimum value have been set to this origin respectively, and an X coordinate direction maximum value and a Y coordinate direction maximum value have been set to correspond to the SX size and the SY size respectively.

Specifically, when the mouse has been clicked within this indication position detecting area PA, it is possible to obtain respective coordinates of a coordinate X1 and a coordinate Y1 that specify the indication position. It is possible to obtain the coordinate X1 and the coordinate Y1 by obtaining origin coordinates of the indication position detecting area PA from the display coordinates of the knob on the screen and by calculating a difference between the mouse clicked position (the coordinate X1, the coordinate Y1) and the origin coordinates of the indication position detecting area PA on the screen respectively.

It is possible to calculate values of P1 and P2 based on the coordinate X1 and the coordinate Y1 obtained above, the minimum values and the maximum values of the X coordinate and the Y coordinate respectively, the SX size and the SY size of the indication position detecting area PA, and the indication position on the knob 31. Specifically, it is possible to calculate the values based on the following equation 1. In this expression, Xmax represents a maximum value of the X coordinate, Xmin represents a minimum value of the X coordinate, Ymax represents a maximum value of the Y coordinate, and Ymin represents a minimum value of the Y coordinate, respectively.

$$P1 = (Xmax - Xmin) \times X1 / SX$$
$$P2 = (Ymax - Ymin) \times Y1 / SY \quad (1)$$

As explained above, according to the first embodiment of the present invention, it is possible to input a plurality of (three, in this example) parameter data by operating one display object.

Specifically, it is possible to set three-dimensional values by operating the knob 31 in one dimension.

Figure 5A:
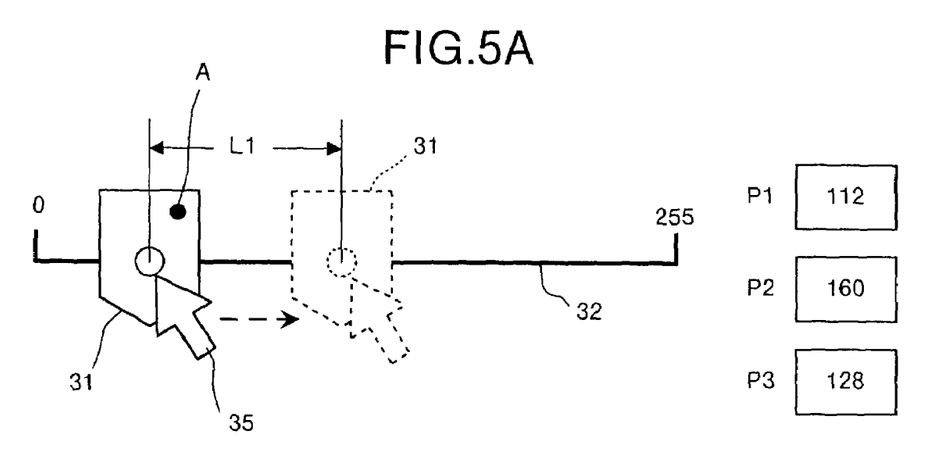
FIG. 5A and FIG. 5B are views that explain another example shown in FIG. 3A and FIG. 3B.
Figure 5B:
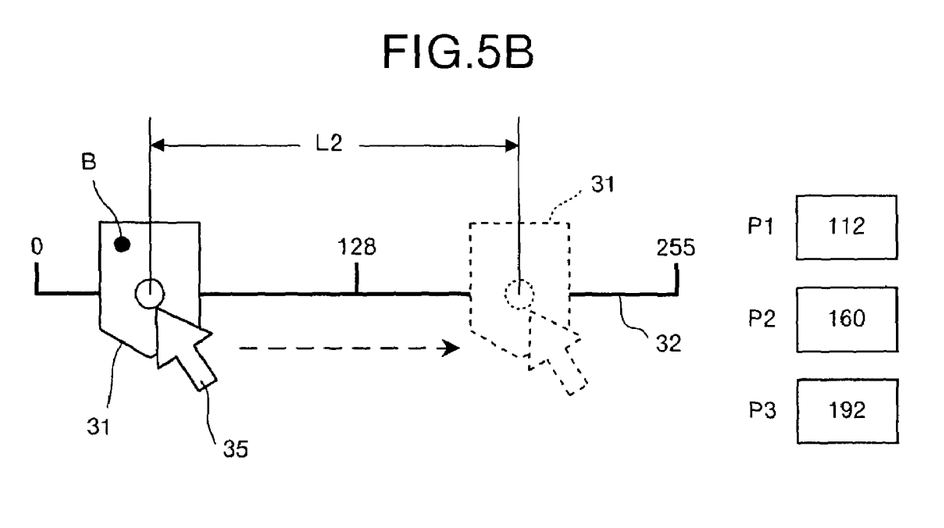

While a slider control is employed in the first embodiment like in the conventional example, it is possible to make smaller the display area of the display object by limiting the move of the knob 31 on the slider control. As shown in FIG. 5, when an indication position on the knob 31 is at point A, the move of the knob 31 is L1, and when an indication position on the knob 31 is at point B, the move of the knob 31 is L2. From the above, it is possible to limit the range of moving the knob between the data. When the range of moving the knob 31 has been limited, it is possible to make small the display area of the display object. Further, along the move of the knob 31, it is also possible to change the shape or length of the knob.

Figure 6:
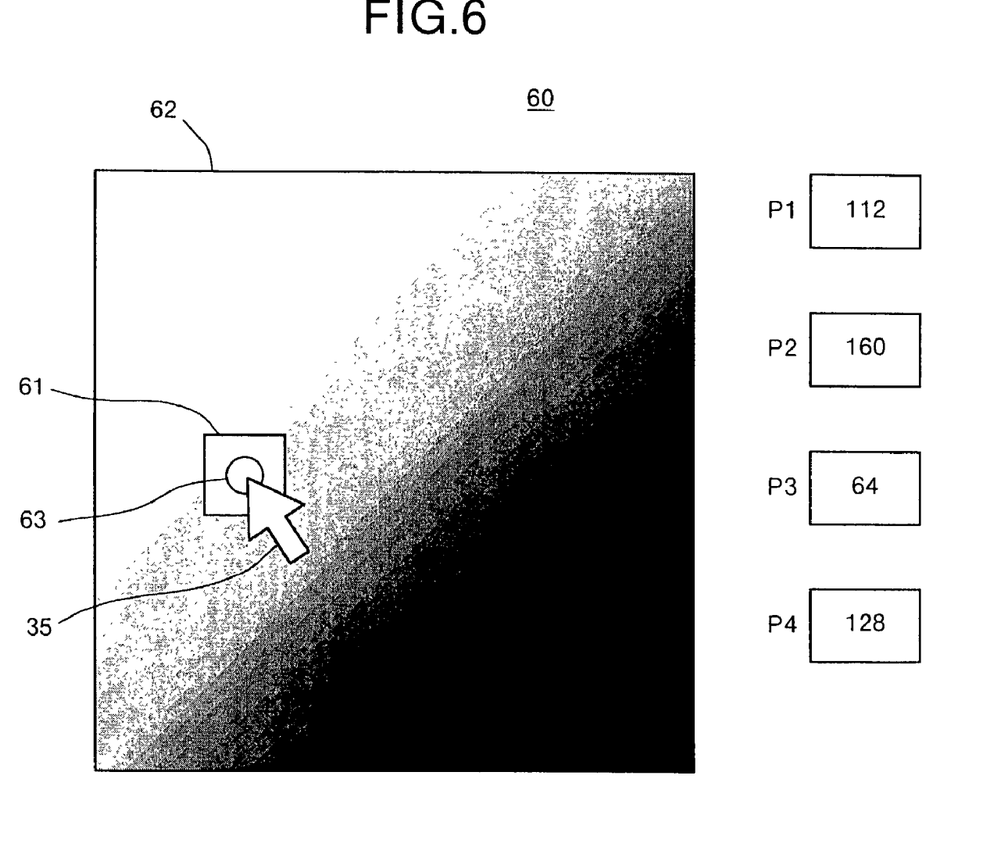
FIG. 6 is a view that shows a screen example of a display object according to a second embodiment of the present invention.

A second embodiment of the present invention will be explained with reference to FIG. 6. Configuration of a data input device relating to the second embodiment is same as the one shown in FIG. 1. As shown in FIG. 6, a display object 60 is constructed of a part that shows a knob 61 that a user operates, and a part that shows a grid 62 within which the knob 61 can move. An area P1 to an area P4 that show values that are set by operating the knob 61 are provided adjacent to the grid 62. A display mode of the display object 60 is similar to that of the color chart shown in the conventional example, except that there is no scale.

In FIG. 6, when the mouse has been operated to move the mouse pointer 35 to the knob 61 and the mouse has been clicked, values are calculated according to the processing of the present invention based on an indication position of the mouse pointer 35 on the knob. The calculated values are displayed in the area P1 and the area P2. These values based on the indication position on the knob 61 are calculated based on the calculation method of the equation 1, in a similar manner to that of the first embodiment.

In the second embodiment, a marker 63 is displayed at the indication position to enable the user to know the position indicated by the mouse pointer 35, in a similar manner to that of the first embodiment. The values calculated based on the indication position on the knob 61 are displayed in the area P1 and the area P2, and values corresponding to the display position of the knob 61 on the grid 62 are displayed in the area P3 and the area P4. The values corresponding to the display position of the knob 61 on the grid 62 are calculated according to a calculation method similar to that used to calculate values at the indication position on the knob 61.

As information that shows a display position of the knob 61 on the grid 62, it is possible to use the indication position of the mouse pointer 35. It is also possible to utilize the origin and weighted center of the indication position detecting area PA that have been set to the knob 61.

Figure 7:
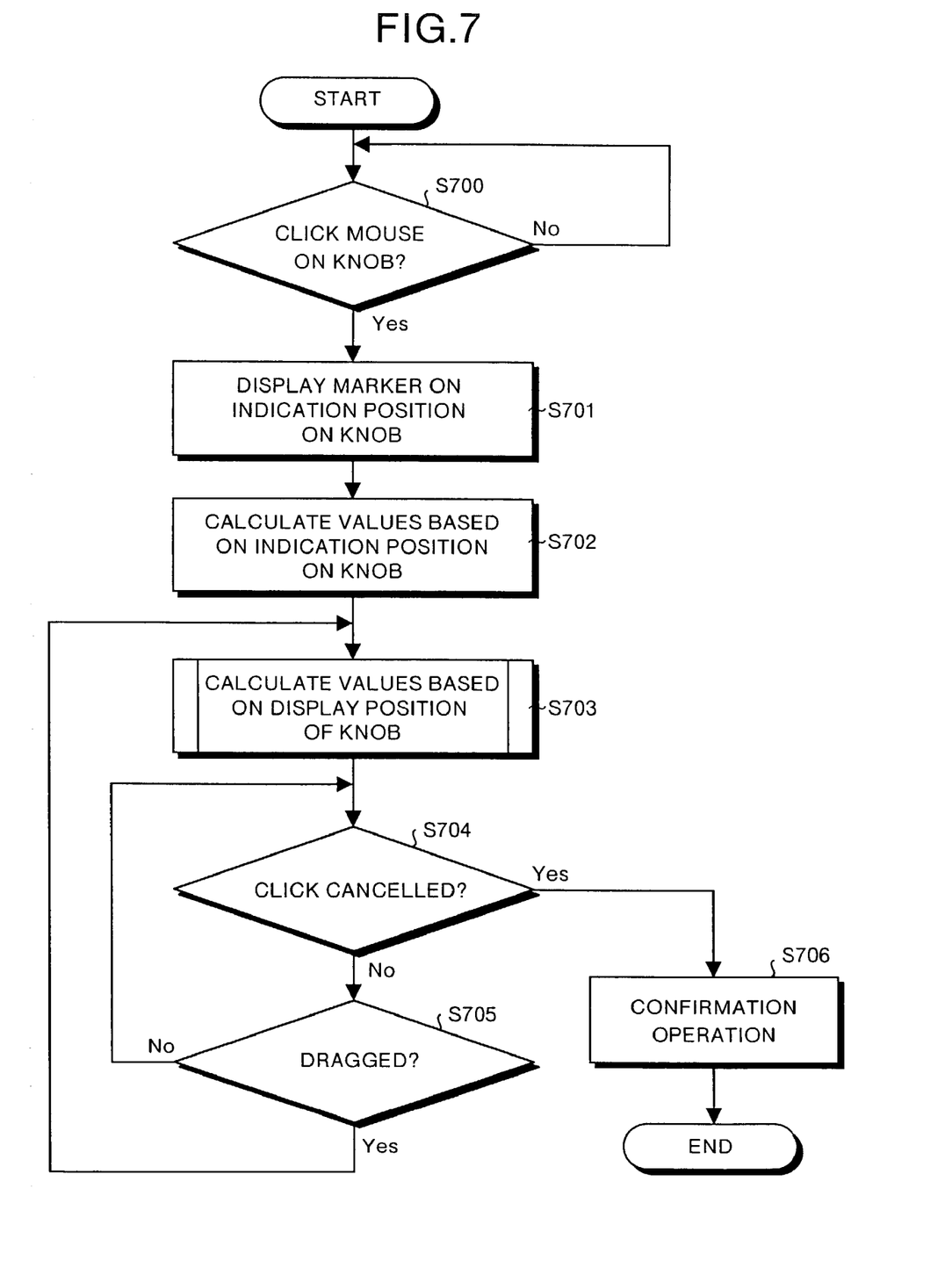
FIG. 7 is a flowchart that shows a processing procedure of the data input method that is applied to the data input device.

A data input method relating to the second embodiment will be explained in detail below with reference to a flowchart shown in FIG. 7. First, when a display object for inputting parameter values has been displayed, it is decided whether the mouse has been clicked on the knob of the display object (step S700). When the mouse has been clicked on the knob (Yes at step S700), a marker is displayed at the indication position of the mouse pointer on the knob (step S701).

Values are calculated based on the indication position on the knob (step S702), and values are calculated based on the display position of the knob (step S703). The values are set to the corresponding display areas P1 and P2 based on the indication position and the display position. Specifically, in the slider control shown in the first embodiment, these values are calculated based on the display position of the knob on the line. In the color chart shown in the second embodiment, these values are calculated based on the display position of the knob on the grid. Then, it is decided whether the click has been canceled (step S704).

When it has been decided that the click has not been cancelled (No at step S704), it is decided whether the dragging operation has been carried out (step S705). When it has been decided that the dragging operation has been carried out (Yes at step S705), the process returns to step S703. Based on this dragging operation, values are calculated based on the display position of the knob that is displayed at present, and the values that have been displayed so far are changed to the values after the calculation in the corresponding display areas. When it has been decided that the dragging operation has not been carried out (No at step S705), the process returns to step S704 to make decision about whether the click has been cancelled.

At step S704, when the click has been cancelled and when an OK button, not shown, has been depressed to confirm values, the values that have been set so far are confirmed as user input parameter values (step S706). Then, the processing ends.

Figure 8:
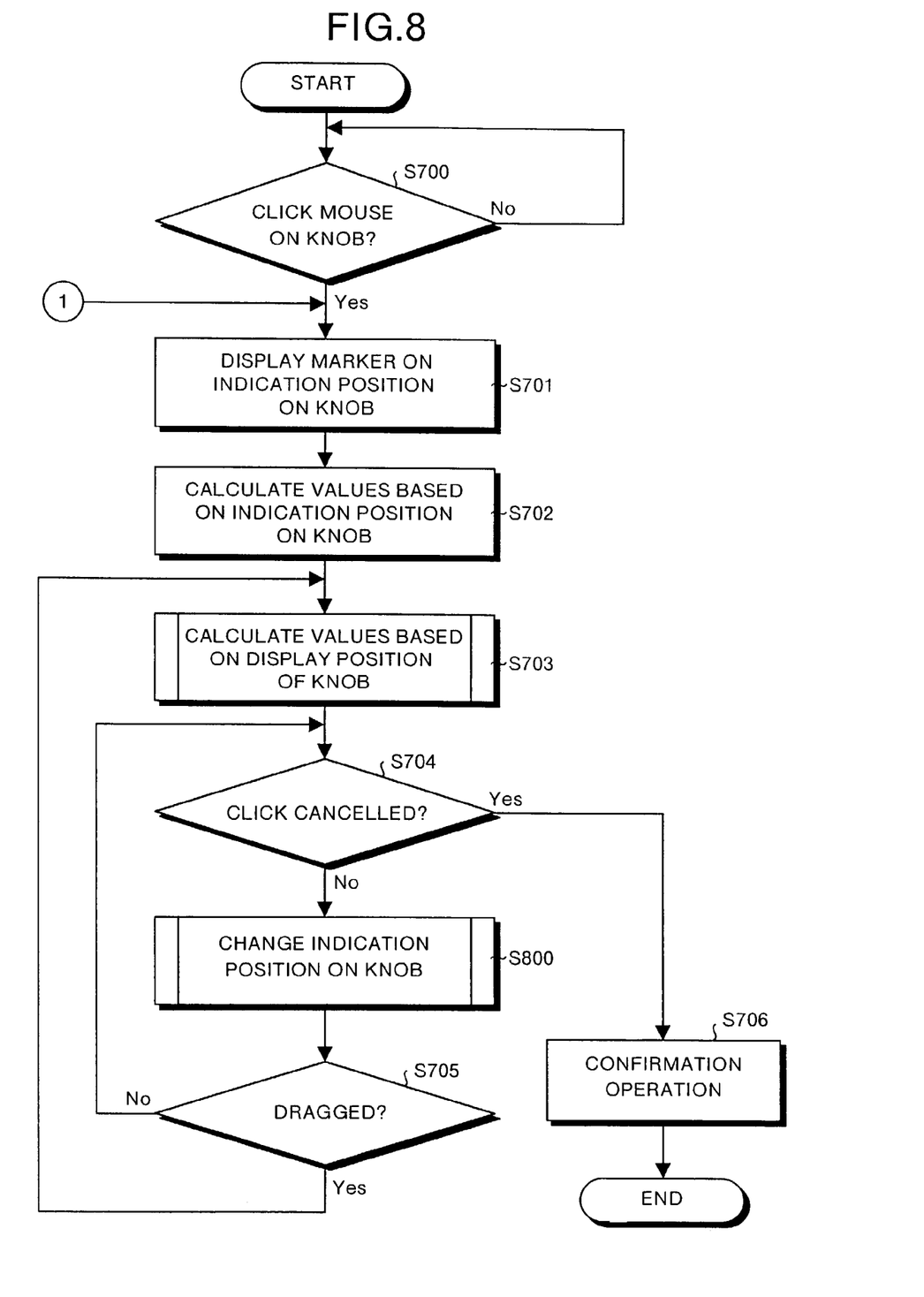
FIG. 8 is a flowchart that shows a processing procedure of a data input method according to a third embodiment.
Figure 9:
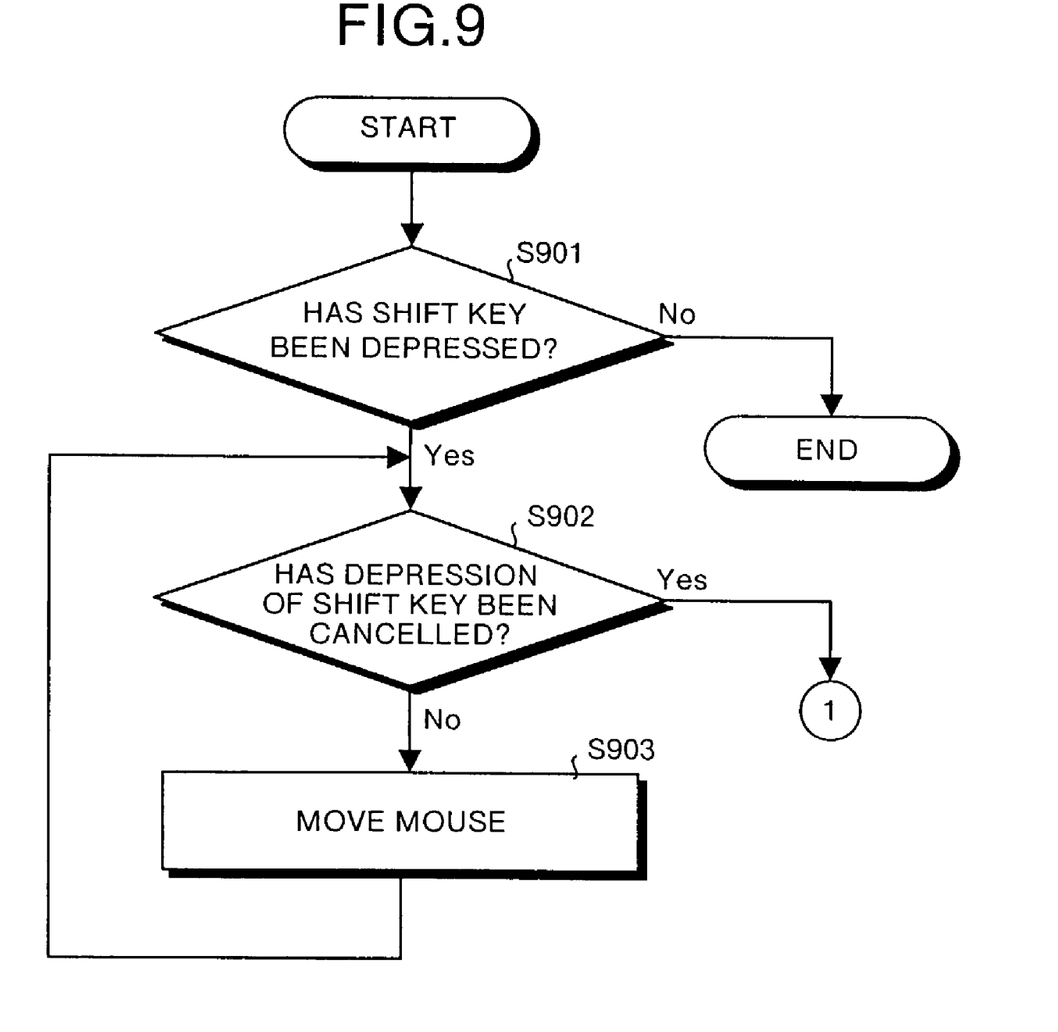
FIG. 9 is a flowchart that shows a processing procedure based on a change of an indication position.

In the second embodiment, once the mouse has been clicked on the knob, the values calculated based on the indication position of the mouse pointer is made firm. However, these values can be changed. This case will be explained below as a third embodiment. Explanation of the processing of which contents are similar to those of the second embodiment will be omitted, and processing that is different from the processing of the second embodiment will be mainly explained. The processing at step S700 to step S704 in FIG. 8 is similar to the processing of the second embodiment. In order to change the position (step S800) a processing according to a flowchart shown in FIG. 9 is carried out. As shown in FIG. 9, it is decided whether a SHIFT key has been depressed in a state that the mouse has been clicked on the knob (step S901).

When it has been decided at step S901 that the SHIFT key has been depressed (Yes at step S901), the user moves the mouse to move the mouse pointer on the knob. At the time of moving the mouse pointer, the mouse is kept clicked without releasing the finger depressed on the mouse. After moving the mouse, when it has been decided that the depression of the SHIFT key has been cancelled (step S901), the process returns to the processing at step S701 shown in FIG. 8. The marker 36 is moved to the position on the knob 31 to which the mouse pointer 35 has been moved at the time of depressing the SHIFT key, thereby to display this marker 36. On the other hand, when the depression of the SHIFT key at step S902 has not been cancelled (No at step S902), the mouse is moved continuously (step S903).

Based on the above processing, it is possible to change the position of the knob at which the mouse has been clicked. By changing the position indicated by the user, it is possible to change the value calculated based on the indication position on the knob to a user's desired value. While the SHIFT key has been used to change the indication position of the mouse pointer in the third embodiment, it is also possible to use other keys such as a CTRL key and an ALT key. Further, instead of the key, it is possible to use other button than that used for the clicking that is provided in the mouse, as an alternative of the SHIFT key.

In other words, any means may be used to indicate a change of a position at which the mouse has been clicked. For example, in the above first to third embodiments, while two values have been calculated based on the indication position on the knob, it is also possible to calculate one value based on a distance from the origin of the X coordinate to the X coordinate of the indication position on the knob. It is also possible to calculate one value based on a distance from the origin of the Y coordinate to the Y coordinate of the indication position on the knob. Alternatively, it is also possible to calculate one value based on a linear distance from the origin to the indication position or the like.

In this case, a value is calculated by setting a minimum value to the origin and setting a maximum value to a coordinate at which the distance from the origin to this coordinate becomes maximum. According to the above embodiments, it becomes possible to set two values by using one display object when the slider control as explained in the first embodiment is used. In other words, it is possible to set two-dimensional values by operating the knob in one dimension. When the color chart as explained in the second embodiment is used, it becomes possible to set three values by using one display object. It is possible to set three-dimensional values by operating the knob in two dimensions.

In the first to third embodiments, while the values are calculated according to the equation 1 by using a position within a display object that has been indicated by the mouse pointer 35, the value calculation method is not limited to the calculation method according to the equation 1. It is also possible to use any calculation expression and calculation method when it is possible to input values of more dimensions than dimensions of the operation directions of the display object. For example, in the first to third embodiments, while the display position within the display object and the value to be set are in a proportional relationship, it is also possible to use a calculation expression that gives an inversely proportional relationship. It is also possible to set values to areas obtained by virtually dividing an object into a plurality of small areas, and use values that have been set to the areas indicated by the mouse pointer 35 as user's input values.

In the first to third embodiments, while values have been calculated based on the indication position on the knob by using the mouse click operation as a trigger, it is also possible to detect a position of the mouse pointer on the knob, and calculate values by using this detection as a trigger. In this case, not only the click on the mouse on the knob is detected in the flowchart at step S700 in FIG. 7 and FIG. 8, but also a position of the mouse pointer 35 on the knob is also detected. When a position of the mouse pointer 35 on the knob has been detected, a marker is displayed at the position of the mouse pointer 35 at step S701, and values are calculated based on the position of the mouse pointer 35 on the knob at step S703. Thereafter, the process returns to step S700 again to detect a position of the mouse pointer 35 on the knob.

It is also possible to optionally change the size and the shape of the knob. It is preferable to change the size to a size which facilitates the user to indicate a position with the mouse pointer 35 and change the shape to a shape which facilitates the user to know input values. The shape of the indication position detecting area PA is not limited to a rectangle, and it is possible to change the shape to follow the shape of the knob. The display of the slider control can be changed to the display of a scroll bar. In this case, it is possible to apply the present invention by using a scroll bar slider that is displayed within the scroll bar as a knob.

As a fourth embodiment, a computer system that executes a data input program that has functions similar to those of the data input device explained in the first to third embodiments will be explained.

Figure 10:
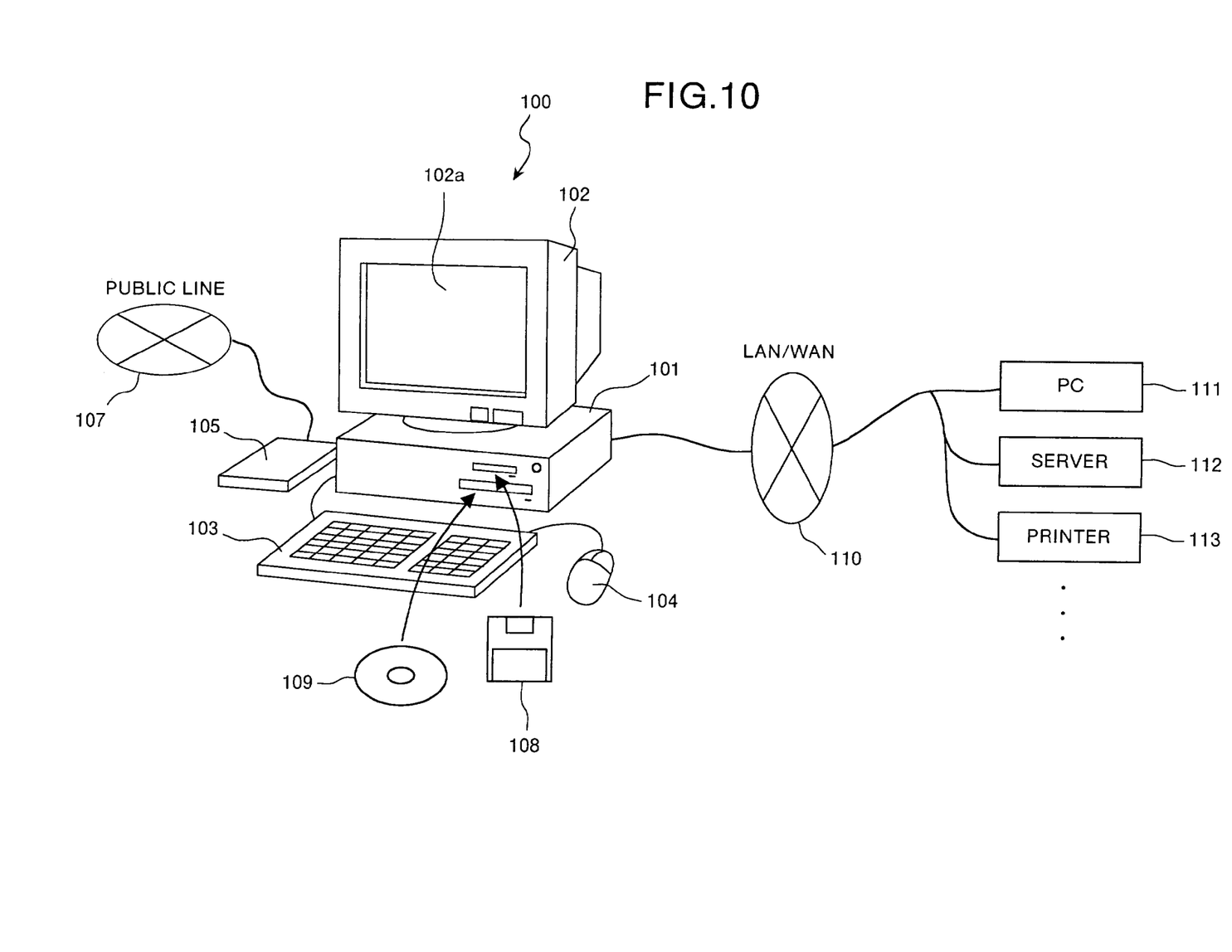
FIG. 10 is a total structure view of a computer system that executes a data input program according to a fourth embodiment.
Figure 11:
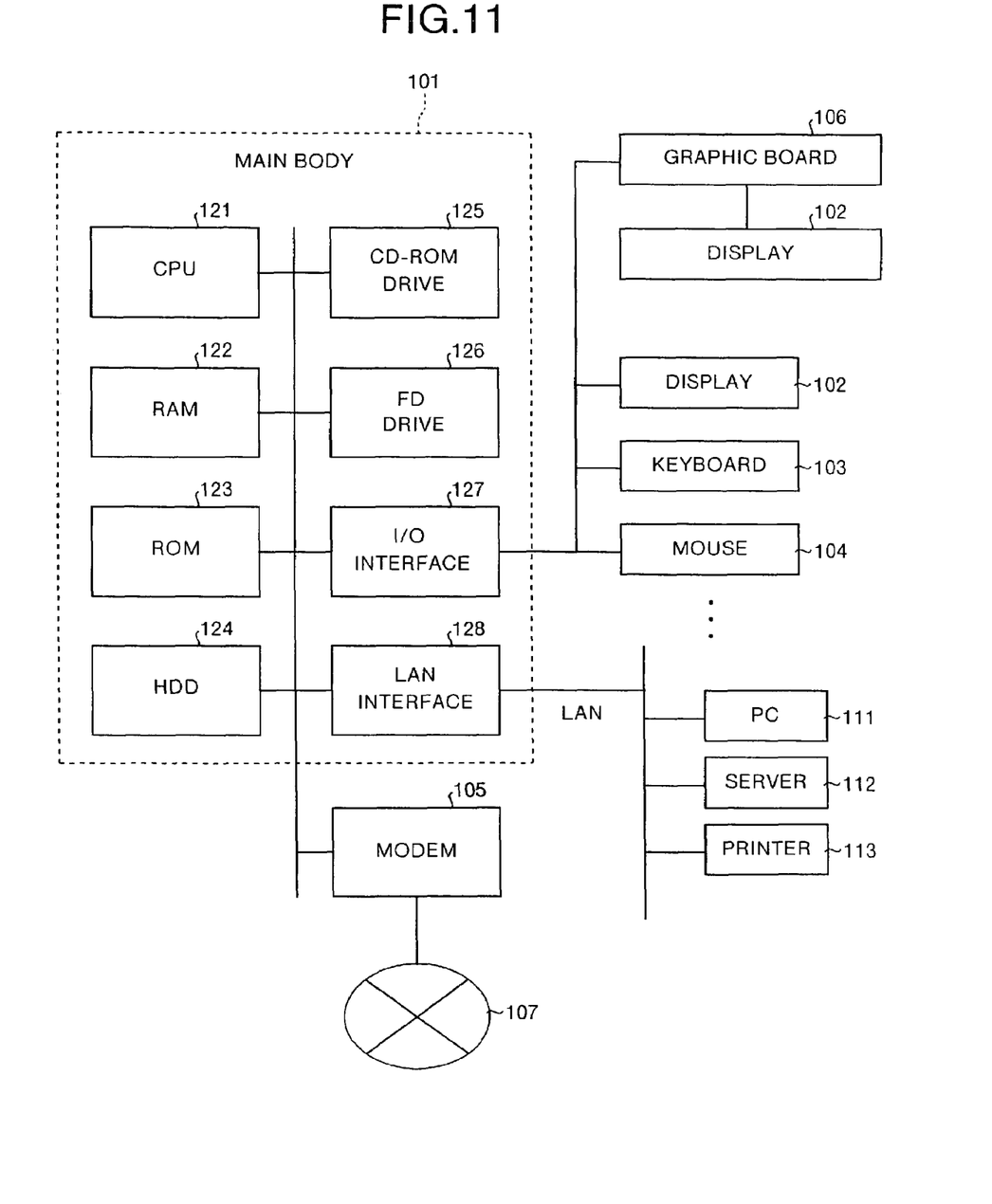
FIG. 11 is a functional block diagram that shows a structure of a main body shown in FIG. 10.

A computer system 100 that is shown in FIG. 10 and FIG. 11 is constructed of a main body 101, a display 102 that displays information such as images on a display screen 102a based on an indication from the main body 101, a graphic board 106, a keyboard 103 from which various information is input to the computer system 100, a mouse 104 that is used to assign an optional position on the display screen 102a of the display 102, a LAN interface that is connected to a local area network (LAN) 110 or a wide-area network (WAN), and a modem 105 that is connected to a public line 107 such as the Internet.

The LAN 110 connects the computer system 100 to other computer system (PC) 111, a server 112, a printer 113 or the like. As shown in FIG. 11, the main body 101 is constructed of a CPU 121, a RAM 122, a ROM 123, a hard disk drive (HDD) 124, a CD-ROM drive 125, an FD drive 126, an I/O interface 127, and a LAN interface 128.

The RAM 122 is used to hold data that has been developed so that the data is displayed on the screen of the display 102. The display data that has been developed by the RAM 122 is displayed on the screen of the display 102 via the graphic board 106. The keyboard 103 has a plurality of character keys and number keys, and is used to input various kinds of data. The mouse 104 is used to selectively indicate with a mouse pointer that is displayed on a display screen 102a of the display 102.

In executing a data input program by the computer system 100, the data input program is installed on the computer system 100. The data input program is stored in a recording medium such as a portable recording medium like a floppy disk (FD) 108, a CD-ROM 109, a DVD disk, an optical magnetic disk, and an IC card, or in a database of the server 112 that has been connected via the line by utilizing the modem 105 and the LAN interface or in the database of the other computer system (PC) 111. The installed model built-up program is stored in the HDD 124, and is executed by the CPU 121 by utilizing the RAM 122 and the ROM 123.

The recording medium includes a portable recording medium such as the CD-ROM 109, the floppy disk 108, the DVD disk, the optical magnetic disk, and the IC card, a recording device such as the hard disks 124 that are provided within and outside the computer system 100, a database of the server 112 that holds a data input program of the original installation that has been connected via the LAN 110, the other computer system 111 and its database, and a transmission medium on the public line 107.

As explained above, according to the fourth embodiment, the computer system 100 executes a data input program that realizes a structure of the data input devices explained in the first to third embodiments by software. With this arrangement, it is possible to obtain effects similar to those of the data input devices explained in the first to third embodiments, by utilizing a general computer system. While the computer system 100 is shown in the fourth embodiment, any hardware structure can be used if this hardware structure can execute the processing of the data input device according to the present invention. The kind of the computer system is not limited to a personal computer, and it is also possible to use on an information terminal device (PDA) or others.

As explained above, according to the present invention, there is provided a data input device that carries out a data input by operating a display object that has a graphic display and user interface function. The data input device comprises an indication position detecting unit that detects an indication position on a display object that has been indicated with a pointer that a user operates, a display position detecting unit that detects a display position of the display object, and an input value setting unit that sets input values of the user based on the indication position on the display object and the display position of on the display object. It is possible to input a plurality of parameter data by operating one display object. Therefore, there is an effect that it becomes possible to input a plurality of parameter values (data) in a small display area. Further, there is an effect that it becomes possible to improve convenience and operability for a user by preventing the hiding of other display information.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A data input device that carries out a data input, the data input device comprising:
   a position indicating unit to set an indication position of a pointer within an indication area of an object, the indication area having a plurality of coordinates, the object being displayed at a display position on a graphic display, the indication position of the pointer and the display position of the object being user-defined;
   an indication position detecting unit that detects the indication position;
   a display position detecting unit that detects the display position of the object within the graphic display; and
   an input value setting unit that sets at least two independent input values based on each indication position obtained by the indication position detecting unit and sets at least one independent input value based on each display position obtained by the display position detecting unit such that at least three independent input values are set by operating the object.

2. The data input device according to claim 1, wherein the object can move only on a line that has a predetermined length, and the at least one independent input value is set based on a display position of the object on the line.

3. The data input device according to claim 1, wherein the object can move only on a plane that has a predetermined size, and the at least one independent input value is set based on a display position of the object on the plane.

4. The data input device according to claim 1, further comprising an indication position changing unit that changes the indication position when the user moves the pointer.

5. The data input device according to claim 1, wherein the input value setting unit sets the at least two independent input values based on the indication position in the indication area, and
   the object can move only on a line that has a predetermined length, and the at least one independent input value is set based on a display position of the object on the line.

6. A data input method of inputting data, comprising:
   detecting an indication position, the indication position being a position of a pointer within an indication area of an object, the indication area having a plurality of coordinates, the object being displayed at a display position on a graphic display, the indication position of the pointer and the display position of the object being user-defined;
   detecting a display position of the object within the graphic display; and
   setting at least two independent input values based on each detected indication position and setting at least one independent input value based on each display position such that at least three independent input values are set by operating the object.

7. The data input method according to claim 6, wherein the object can move only on a line that has a predetermined length, and the at least one independent input value is set based on a display position of the object on the line.

8. A computer-readable medium encoded with a computer program for inputting data, the program when executed by a computer causing the computer to perform a method comprising:

detecting an indication position, the indication position being a position of a pointer within an indication area of an object, the indication area having a plurality of coordinates, the object being displayed at a display position on a graphic display, the indication position of the pointer and the display position of the object being user-defined;

detecting a display position of the object within the graphic display; and     setting at least two independent input values based on each detected indication position and setting at least one independent input value based on each display position such that at least three independent input values are set by operating the object.

9. A data input device that carries out a data input, the data input device comprising:

a position indicating unit to set an indication position of a pointer on an object, the object being displayed at a display position on a graphic display, the object having a sub-field in which the pointer is positioned, the sub-field having a plurality of coordinates and the indication position being a coordinate position with respect to the sub-field, the indication position of the pointer and the display position of the object being user defined;

an indication position detecting unit that detects the indication position;

a display position detecting unit that detects a display position of the object on the graphic display, the graphic display having a main field in which the object is positioned and the display position being with respect to the main field, the position of the object being user defined; and     an input value setting unit that sets at least two independent input values based on each indication position and sets at least one independent input value based on each display position such that at least three independent input values are set by operating the object.

* * * * *